(12) United States Patent
Petrick et al.

(10) Patent No.: US 8,909,839 B2
(45) Date of Patent: *Dec. 9, 2014

(54) ELECTRONIC DEVICE STORAGE TRAY

(71) Applicant: Bretford Manufacturing, Inc., Franklin Park, IL (US)

(72) Inventors: Matthew Petrick, Oak Park, IL (US); Chris Brandel, Northfield, IL (US); Chris Petrick, Park Ridge, IL (US)

(73) Assignee: Bretford Manufacturing, Inc, Franklin Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/931,301

(22) Filed: Jun. 28, 2013

(65) Prior Publication Data

US 2013/0290592 A1    Oct. 31, 2013

Related U.S. Application Data

(63) Continuation of application No. 13/018,051, filed on Jan. 31, 2011, now Pat. No. 8,503,182.

(60) Provisional application No. 61/312,886, filed on Mar. 11, 2010.

(51) Int. Cl.
G06F 13/00 (2006.01)

(52) U.S. Cl.
USPC ............ 710/303; 361/724; 361/727; 439/521

(58) Field of Classification Search
USPC ........ 361/679.01–679.45, 724–727; 439/521, 439/488, 490; 312/223.1, 283, 223.2, 29; 710/303
See application file for complete search history.

(56) References Cited

U.S. PATENT DOCUMENTS

| 5,301,346 | A  | * | 4/1994 | Notarianni et al. | ........... | 700/267 |
| 8,503,182 | B2 | * | 8/2013 | Petrick et al. | ................. | 361/727 |
| 2009/0096336 | A1 | * | 4/2009 | Petrick et al. | ................. | 312/237 |

* cited by examiner

Primary Examiner — Mark Hellner
(74) Attorney, Agent, or Firm — Anderson Gorecki & Rouille LLP

(57) ABSTRACT

A desk-top storage solution for portable computing devices is formed as a storage tray. The storage tray has pockets sized to cradle individual portable computing devices. Each pocket includes a wire management system to enable an electrical connector to be provided within the pocket and secured relative to the pocket to enable the portable computing device to be quickly electrically connected to the storage tray. A USB hub is provided within the storage tray which interconnects with the electrical connectors and enables the portable computing devices to be charged while stored in the storage tray and also synchronized with an external computer while contained within the storage tray. The storage tray has a lid that is connected to the base by position control friction hinges which regulate the motion of the lid relative to the base during ascent/descent while the lid is moved between open and closed positions.

7 Claims, 10 Drawing Sheets

ELECTRONIC DEVICE STORAGE TRAY

CROSS-REFERENCE TO RELATED APPLICATIONS

This application is a continuation of U.S. patent application Ser. No. 13/018,051, entitled Electronic Device Storage Tray, now U.S. Pat. No. 8,503,182, which claims priority to U.S. Provisional Patent Application No. 61/312,886, filed Mar. 11, 2010, the content of each of which is hereby incorporated herein by reference.

BACKGROUND OF THE INVENTION

1. Field of the Invention

The present invention relates to storage systems and, more particularly, to a tray designed to house and store portable computing devices.

2. Description of the Related Art

Portable computing devices, such as tablet computers and iPads™ Apple, Inc. are commonly used in educational facilities to enrich the curriculum provided to students. Likewise, these types of devices are increasingly being used in other contexts, such as in museums, to enable people to interact with the exhibits present in the museum.

Computer carts have been developed which enable multiple portable computing devices to be charged and synchronized while being stored. However, computer carts are typically free-standing wheeled devices which take up floor space and, accordingly, may not be provide the optimal storage solution in every situation. Particularly where a smaller number of portable computing devices to be maintained is relatively small, or where the portable computing devices are not required to be moved from room to room, it may be desirable to provide an alternative storage solution to a conventional computer cart.

SUMMARY OF THE INVENTION

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

A desk-top storage solution for multiple portable computing devices is provided which is formed as a storage tray. The storage tray has a number of pockets sized to cradle individual portable computing devices. Each pocket includes a wire management system to enable an electrical connector to be provided within the pocket and secured relative to the pocket to enable the portable computing device to be quickly electrically connected to the storage tray. A USB hub is provided within the storage tray which interconnects with the electrical connectors and enables the portable computing devices to be charged while stored in the storage tray and also synchronized with an external computer while contained within the storage tray.

The storage tray includes a lid connected to the base in which the pockets are formed. The lid is connected by position control friction hinges which regulate the motion of the lid relative to the base during ascent/descent while the lid is moved between open and closed positions. The friction hinges prevent the lid from slamming into the base while closing and also help hold the lid in an upright position while the lid is opened to provide access to the portable computing devices stored within the storage tray. The lid may be secured while in a shut position using a cam lock or other locking mechanism.

BRIEF DESCRIPTION OF THE DRAWINGS

Aspects of the present invention are illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures.

DETAILED DESCRIPTION

FIGS. 1-4 show perspective views of one embodiment of a desk-top storage solution for multiple portable computing devices. In the embodiment shown in FIGS. 1-4, the desk-top storage solution is implemented as a storage tray 10.

Figure 3:
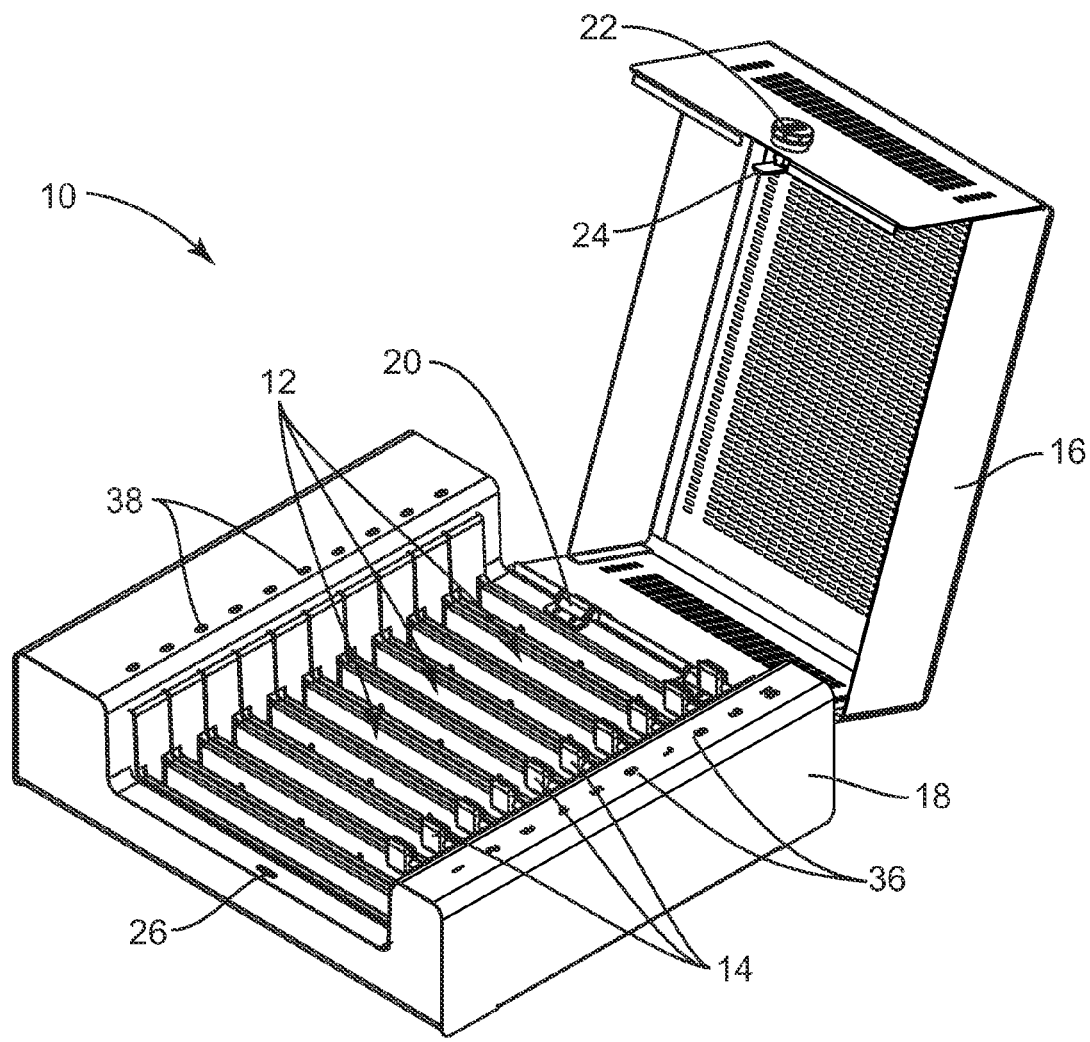
FIGS. 3 and 4 are perspective views of the storage tray of FIGS. 1 and 2 with the lid in an open position.
Figure 4:
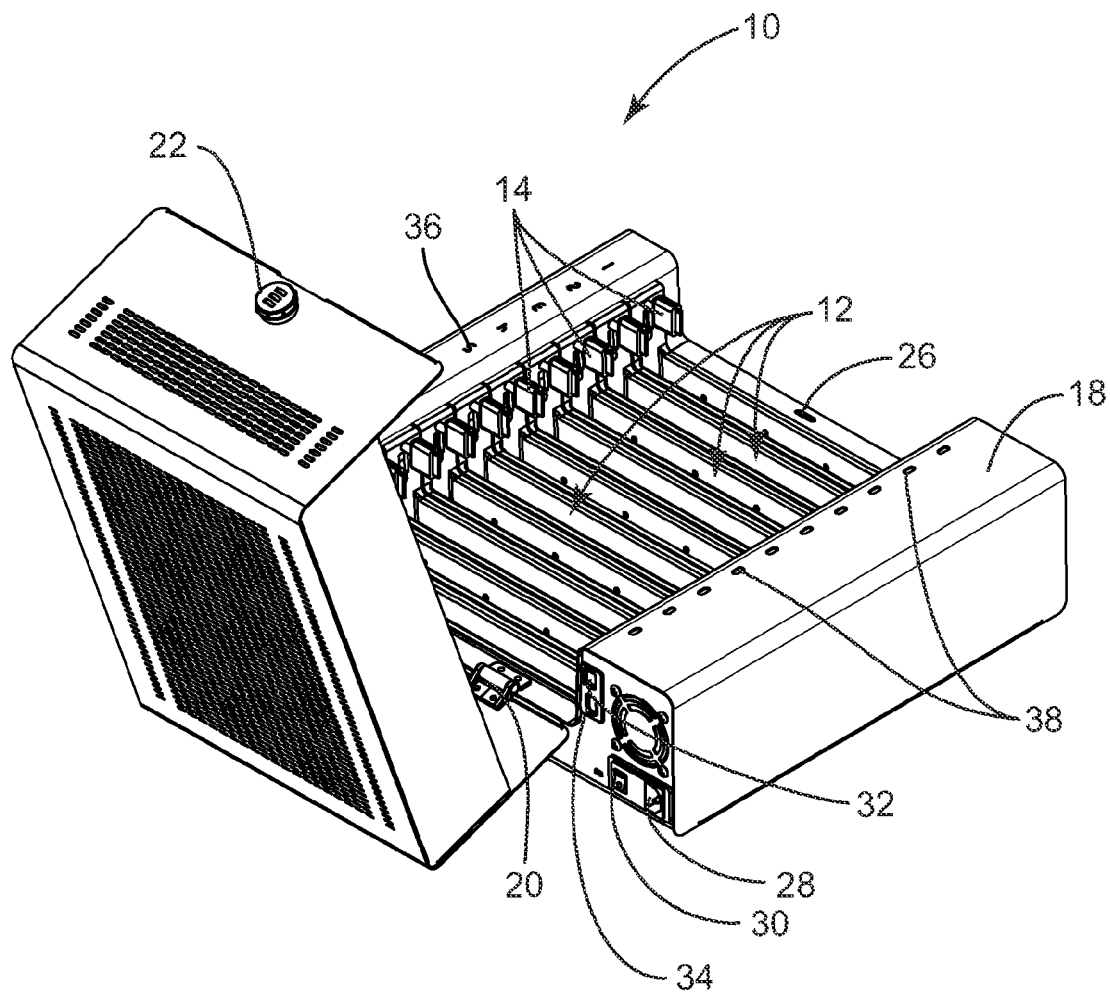
Figure 5:
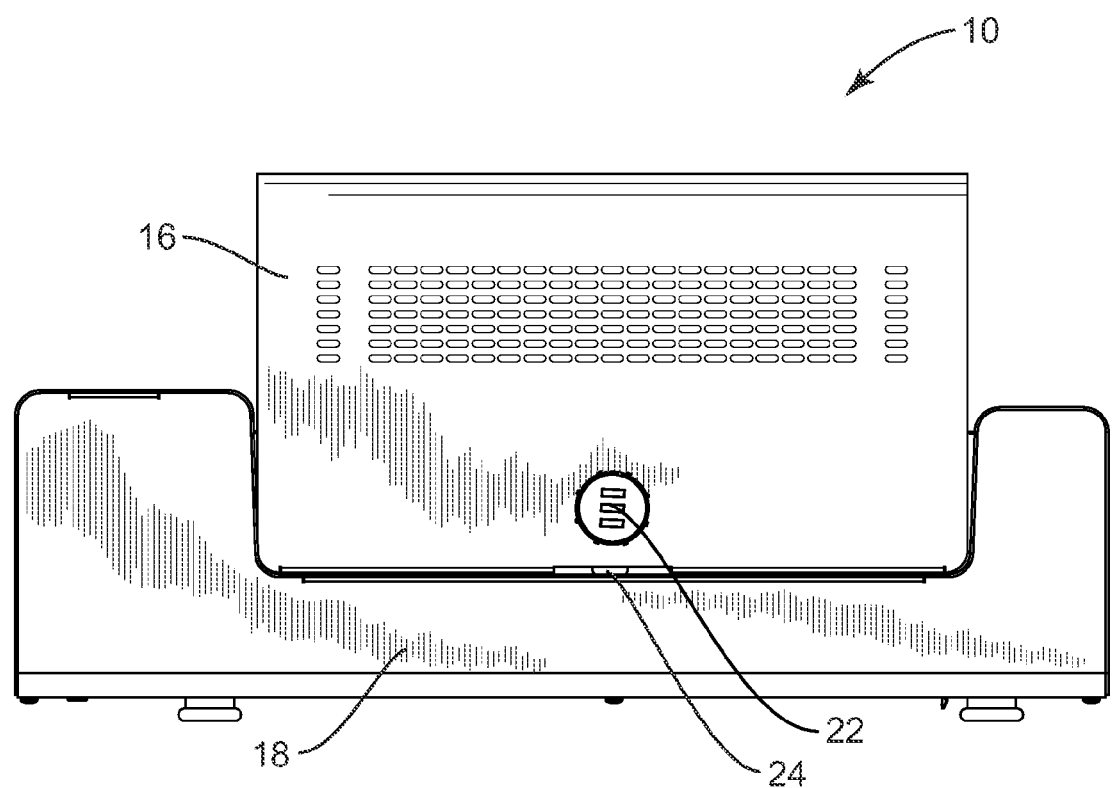
FIG. 5 is a front view of the storage tray with the lid in a closed position.

As shown in FIGS. 3-4, the storage tray has a number of pockets 12 are formed in the base 18 and sized to cradle individual portable computing devices. The pockets are defined by a pair of dividers which physically separate a lower area of the tray into individually sized storage areas so that the portable computing devices are able to be held approximately vertically within the tray. In one embodiment, the pockets are designed to allow the portable computing devices to lean slightly backward so that a viewing screen of the portable computing devices is slanted toward a front of the tray while the portable computing devices are stored within the tray. Each pocket is designed to hold a single portable computing device such as a tablet computer, or iPad™ (Apple Inc.). The pockets may be plastic or another material and fitted into a metal shell forming the base 18.

Figure 1:
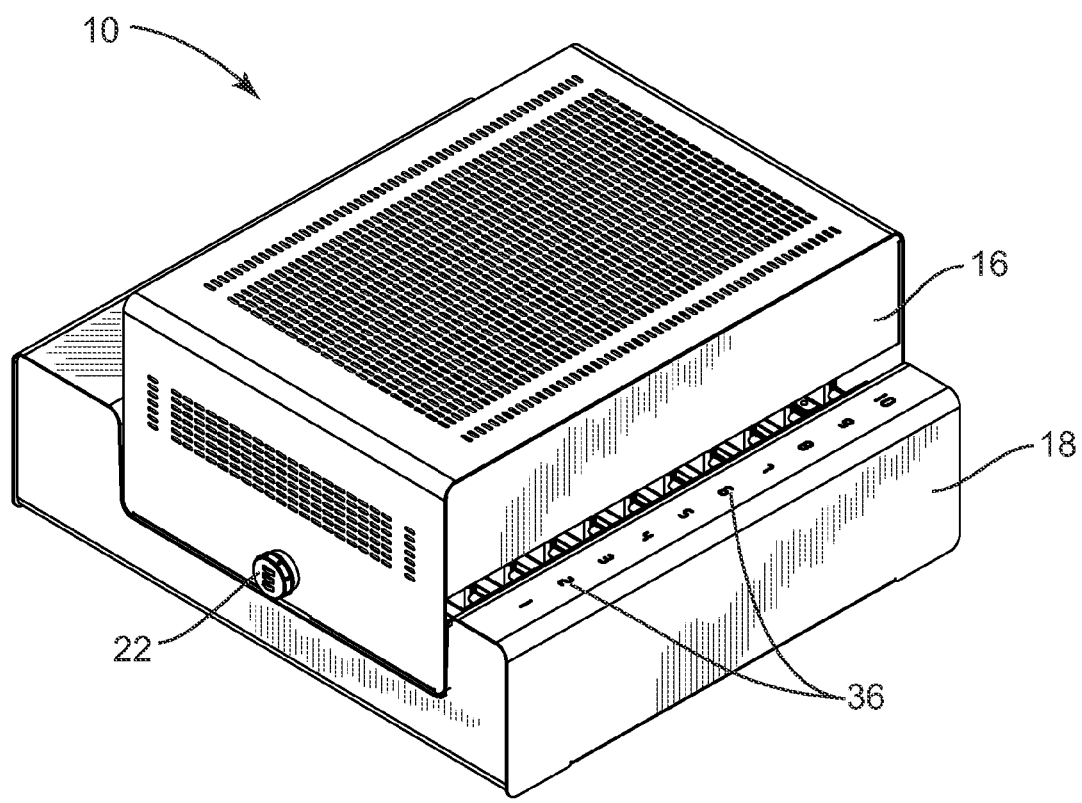
FIGS. 1 and 2 are perspective views of an storage tray with a lid in a closed position.
Figure 2:
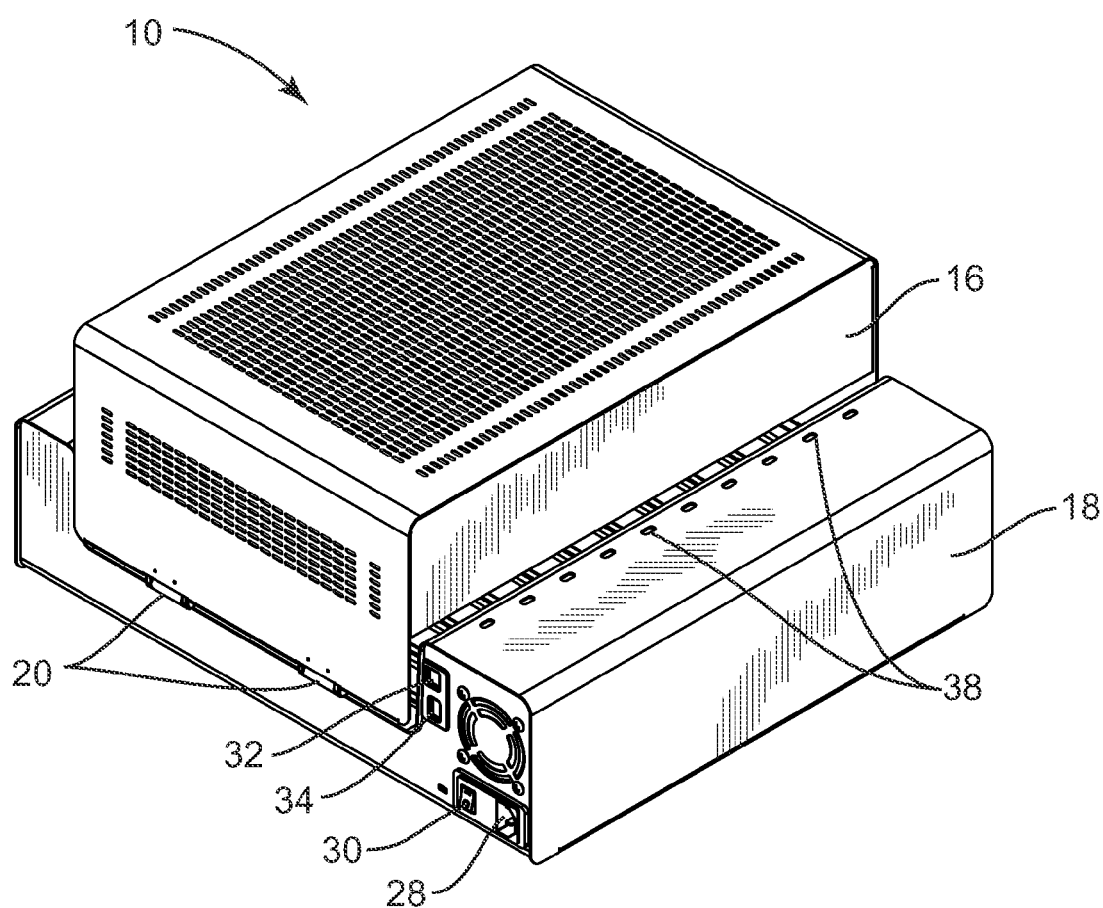

A lid 16 is connected to a base 18 in which the pockets are defined. FIGS. 1 and 2 show the storage tray with the lid in the closed position and FIGS. 3 and 4 show the storage tray with the lid in the opened position. The lid serves to encase the area of the storage tray where the pockets are formed to prevent the portable computing devices stored within the tray from being damaged or removed from the tray. The lid may fully encase the area of the base where the portable computing devices are stored or may partially encase that portion of the base to partially expose the portable computing devices depending on the implementation.

In one embodiment, the lid 16 is connected to the base 18 by position control frictional hinges 20 which regulate the motion of the lid relative to the base during ascent/descent. Position control frictional hinges are designed to provide a constant amount of torque friction to enable the hinges to hold their position throughout their full range of motion. The position control frictional hinges prevent the lid from slamming into the base while closing and also help hold the lid in an upright position while the lid is opened to provide access to the portable computing devices stored within the storage tray. Frictional hinges are commercially available, for example from South Co. of Concordville, Pa., and Reeell Precision Manufacturing Corporation of St. Paul, Minn. Position control frictional torque hinges may be available from other suppliers as well, and the invention is not limited to use of hinges from one of these particular suppliers.

The lid 16 may be secured while in a shut position using a cam lock 22 or other locking mechanism. The cam lock may be a combination lock or key lock and has a tongue 24 which can be rotated to engages slot 26 when the lid is in the closed position to secure lid 16 relative to base 18. Perforations may be formed in the lid to enable heat generated by the portable computing devices to be ventilated from the tray. Optionally active ventilation may be utilized to cool the portable computing devices as well depending on the expected amount of heat generated by the portable computing devices.

A female power input by International Electrotechnical Commission (IEC) power socket 28 is formed on the rear of the storage tray to enable a power cord to be used to connect the storage tray to a wall outlet. A main power switch 30 controls power to the tray.

As shown in FIGS. 3-4, an electrical connector 26 is fed through into each pocket to be accessible at an edge of each pocket. Having the electrical connector accessible within each pocket makes it easy for a person to detach a portable computing device from the tray when removing the portable computing device from the tray, and to then re-attach the portable computing device to the electrical connector when returning the portable computing device to the tray. The electrical connector electrically connects to a charging circuit to enable power to be input to the portable computing devices while stored within the tray. Optionally, depending on the particular type of portable computing device, the electrical connector may also enable data access to the portable computing device. For example, as described below, the portable computing devices may be synchronized with a master computer while being stored within the tray.

In one embodiment a Universal Serial Bus (USB) Standard-B connector 32 is provided to enable the tray to be connected to an external computer so that the portable computing devices stored within the tray may be synchronized with the external computer. a USB Standard-B connector is an approximately square shaped USB connector that is commonly utilized on peripheral devices such as printers to allow the peripheral device to be connected to a master device. The tray may also include a USB Standard-A connector 34 to allow other similarly configured trays to be connected to the illustrated tray. In operation, a master computer would connect to tray 10 by connecting a USB cable from USB Standard-B port 32 on the tray 10 to a USB Standard-A port on the master computer. If another similarly configured tray were to be connected to the master computer through the tray 10, the second similarly configured tray would be connected to the tray 10 using a USB cable extending from the USB Standard-B port on the second tray to the USB Standard-A port on the first tray. Multiple trays may be connected in this fashion. Currently the USB standard allows up to 127 devices to be recognized on a given USB port so, in practice, at most 12-13 trays may be daisy-chained together in this manner.

Figure 7:
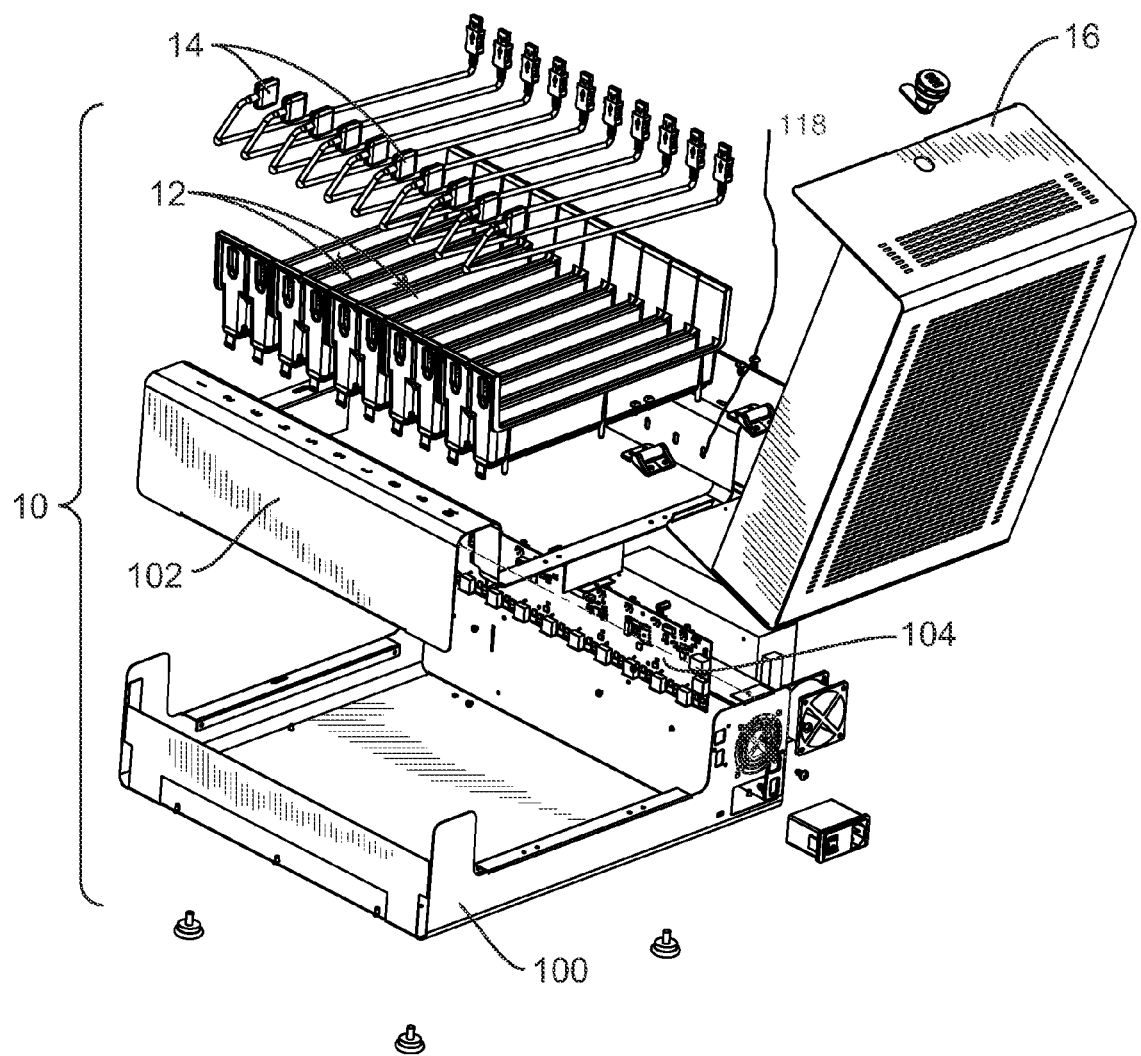
FIGS. 7-8 are exploded views of the storage tray showing internal construction of the tray.
Figure 8:
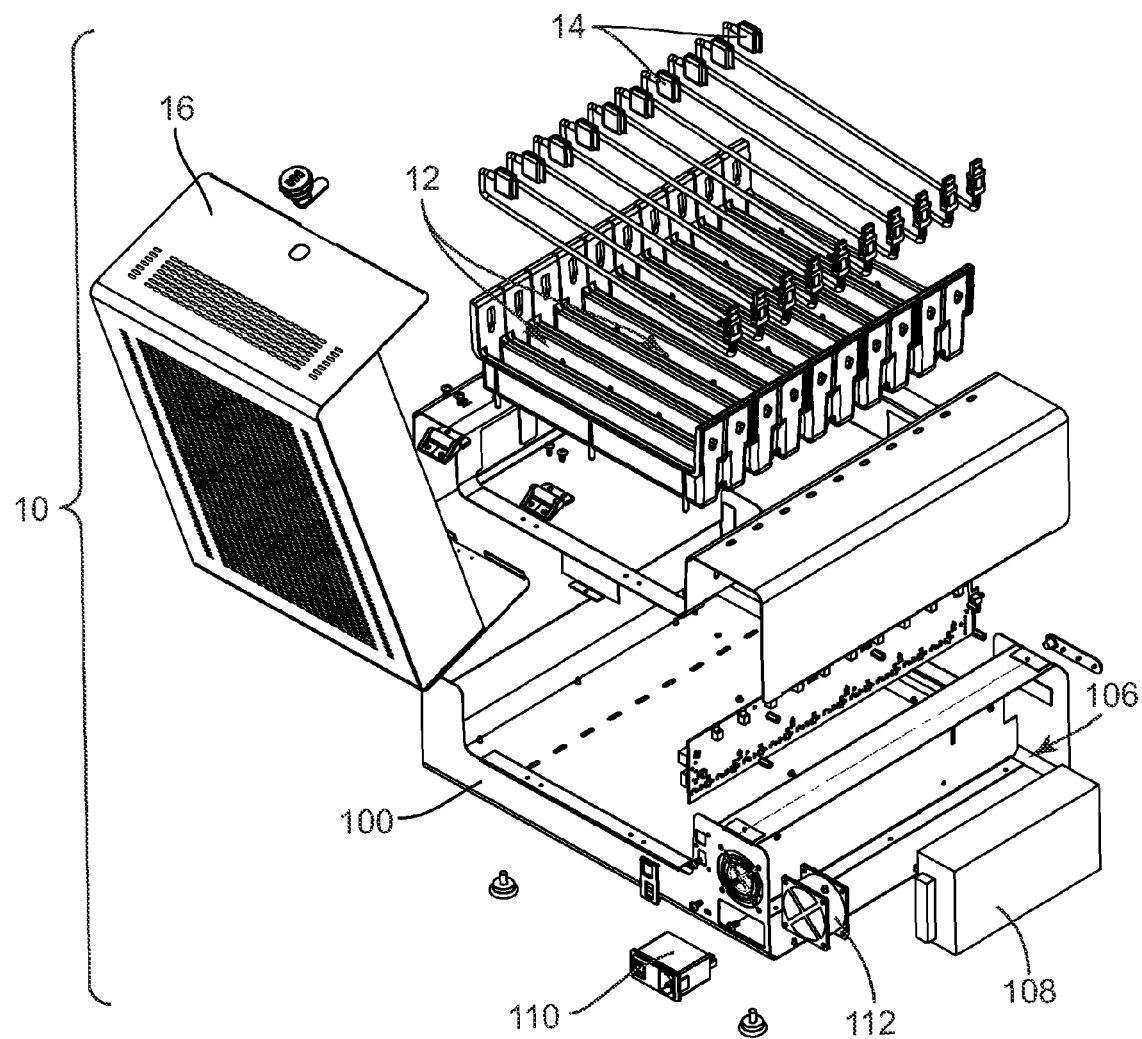

FIGS. 7-8 show exploded views of the storage tray to show the internal construction of the storage tray. As shown in FIG. 7, the storage tray 10 is formed to have a bottom casing 100 defining the base of the tray and an upper casing 102 defining a top surface of the tray. An electronic circuit board 104 implementing the 10 port USB hub described above is encased in an electronics region 106 defined by the top and bottom casings. A power supply 108 and plug/switch module 110 is also contained within electronics region 106. A fan 112 is used to provide active ventilation to the electronics region to enable heat generated by the USB hub and power supply to be removed from the electronics region.

Figure 9:
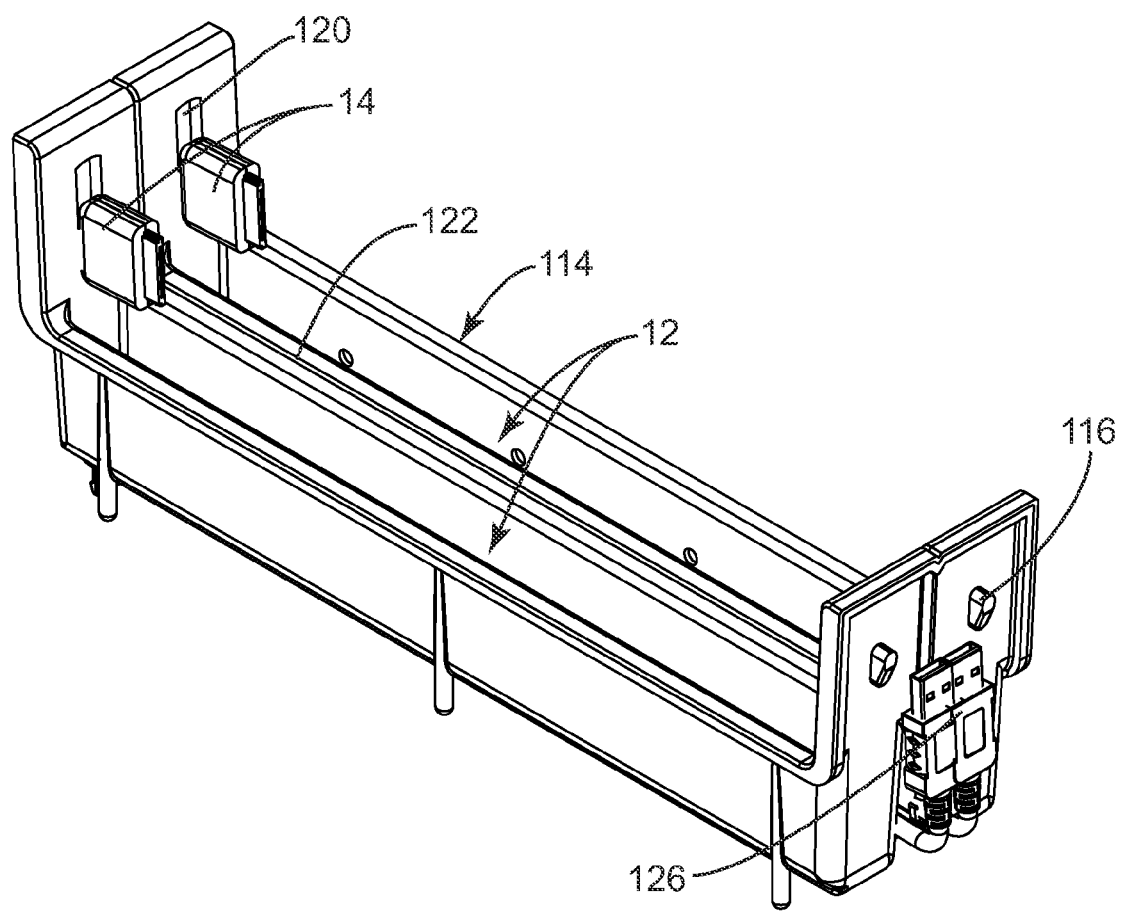
FIGS. 9 and 10 are enlarged perspective views of pockets used in the storage tray according to an embodiment.
Figure 10:
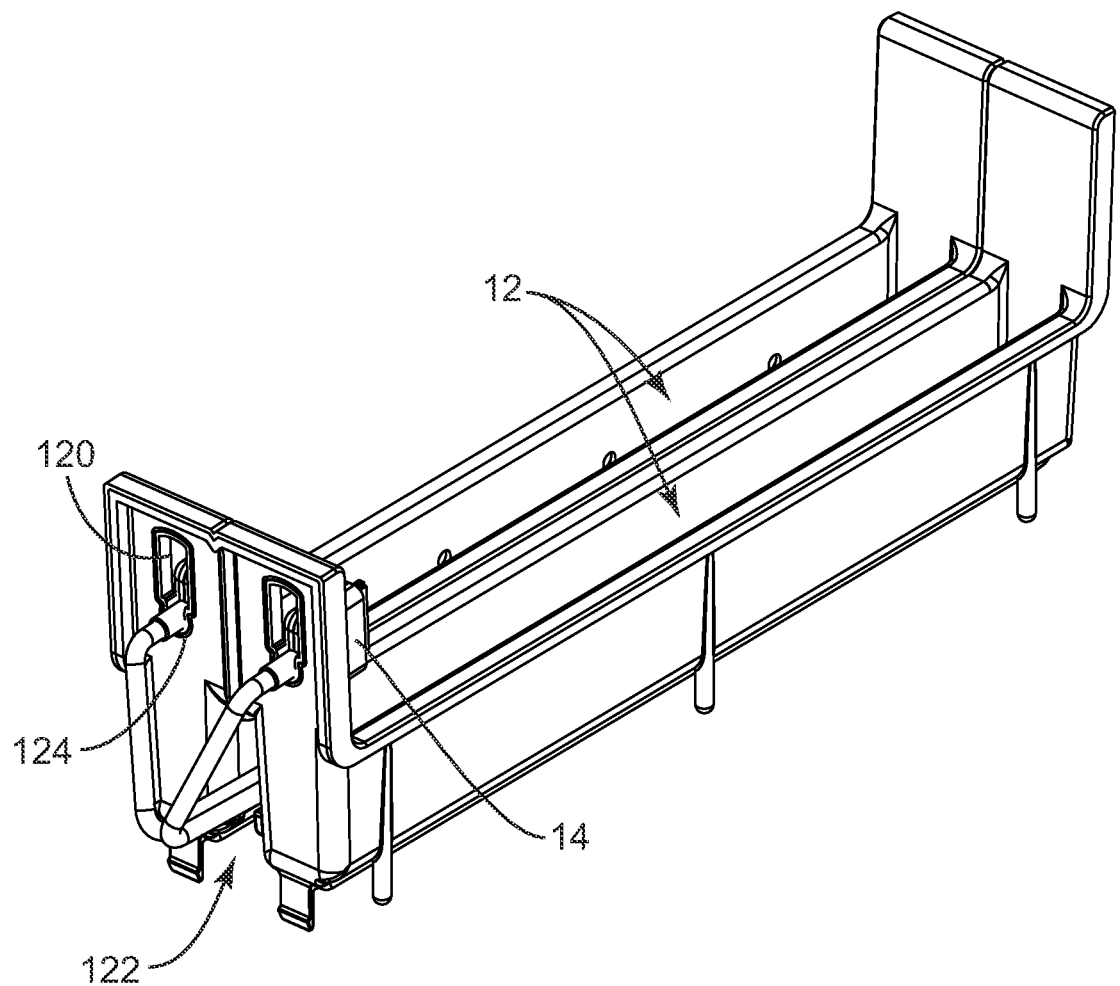

Inserts 114 (see FIGS. 9-10) forming pockets 12 are inserted through an aperture in upper casing 102 and snap into the upper casing. In one embodiment tapered tabs 116 are press-fitted into apertures 118 to enable the inserts to snap into the upper casing so that the pockets 12 are locked into position in the upper casing. Alternative ways of attaching the inserts may be used as well. The inserts are preferably formed from plastic. In the embodiment shown in FIGS. 9-10 each plastic insert is formed to include two pockets defined therein. Prior to inserting the plastic inserts into the upper casing, a pair of electrical connectors 14 are inserted into apertures 120 and fed along trough 122 between the pair of pockets to be connected to the printed circuit board 104 implementing the USB hub. In the embodiment shown, each aperture 120 has a lower portion 124 sized to engage a casing of the electrical connector to secure the electrical connector and an upper area sized to enable male USB connector 126 to be fed therethrough. Preferably the aperture 120 is sufficiently small to prevent the end of the electrical connector 14 opposite the mail USB connector from being pulled through the aperture. Allowing the wires to be attached to the inserts prior to insertion of the inserts into the tray facilitates wiring of the tray.

In one embodiment, the tray is configured to enable all portable computing devices stored within the tray to be synchronized with a master computer connected to the tray. Once the content that is to be synchronized is organized, the synchronization process may be activated to cause each of the portable computing devices stored within the tray to be synchronized with the master computer.

Figure 6:
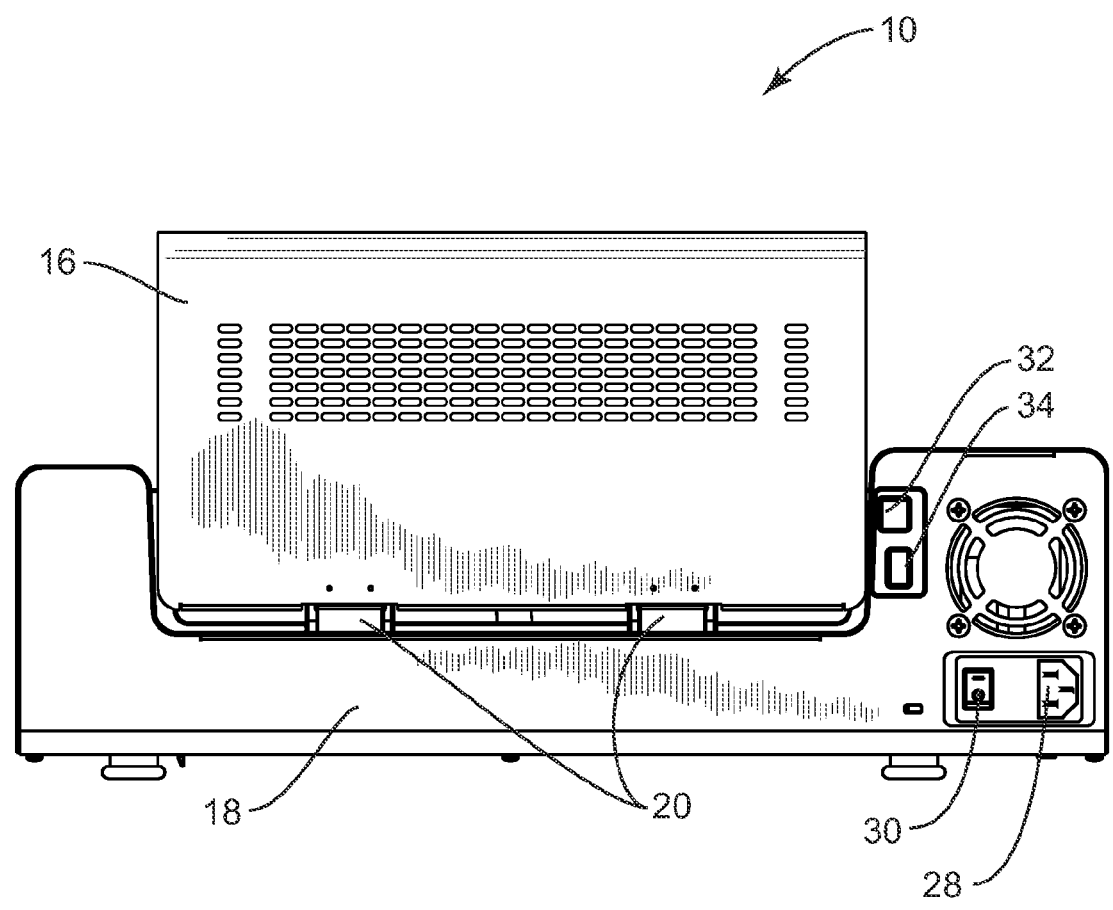
FIG. 6 is a rear view of the storage tray with the lid in a closed position.

One way for multiple portable computing devices to be synchronized with a master computer is to use iTunes™ (Apple, Inc.) software to synchronize content to the multiple portable computing devices. In this example, the content to be synchronized is loaded and organized within the iTunes™ software package, e.g. by causing the content to be organized into a playlist. The portable computing devices to be synchronized are inserted into the tray and connected to the electrical connectors. The master computer should be ON, with no applications running. The tray should be plugged into the wall outlet, but should have the master power switch 30 (see FIG. 6) turned off.

With the tray and master computer in this state, a USB cable is used to connect the master computer to the USB port 32 on tray. The main power switch 30 to the tray is then switched to the ON position. Once the power to the tray has been restored, iTunes™ should be started on the master computer. Once iTunes™ launches, it will recognize each of the portable computing devices connected to the tray. As each portable computing device is recognized by the iTunes™ software on the master computer it will be synchronized with the master computer. Once the synchronization process has been completed, the individual portable computing devices may be ejected individually or the iTunes™ software may be closed on the master computer to cause all devices to be ejected at once.

Some devices, such as the current version of the iPad™ tablet computer available from Apple, Inc., will not synchronize and charge at the same time. For these devices, once the synchronization process has been completed, the USB cable connecting the master computer to the tray should be disconnected so that the iPad™ devices may be charged while stored in the tray.

Occasionally iTunes™ may automatically check for new software updates, including available updates for iTunes™ itself and any attached iPads™. This feature may interfere with synchronizing multiple iPads™ and, hence, should be administratively disabled prior to synchronizing the master computer with iPads™ stored within the tray.

In one embodiment the structure defining the pockets is formed from molded plastic and includes wire management system incorporated therein to enable electrical connectors 14 to be provided within the storage tray for connection to the electronic devices stored therein.

Each pocket includes wire management to enable an electrical connector to be provided within the pocket and secured relative to the pocket to enable the portable computing device to be quickly electrically connected to the storage tray. A USB hub is provided within the storage tray which is powered by power received via plug 28 and is connected to electrical connectors 14 as well as USB ports 32, 34. The USB hub interconnects with the electrical connectors and enables the portable computing devices to be charged and synchronized via an external source (e.g. master computer) while stored within the storage tray.

One example of a USB hub that may be utilized to implement the USB hub is described in greater detail in U.S. patent application Ser. No. 13/017,098, entitled High Current Multi-Port USB Hub, filed Jan. 31, 2011, the content of which is hereby incorporated herein by reference. In this application, a USB hub containing 10 high current USB ports is described, which also includes USB ports 32, 34 to allow synchronization and serially connecting similarly configured USB trays. The high current USB hub described in this US Patent Application allows portable electronic devices such as iPad™ devices to be charged at high current levels (up to 2.1 Amp 5V DC) when not synchronizing with a master computer and also allows the mode of operation to change to provide lower current levels while synchronization is in progress.

In one embodiment, each pocket 12 within the tray 10 is numbered with numbers 36 as shown, for example, in FIG. 3. The numbers in one embodiment are laser cut into an edge of the tray 18 and enable each pocket to be uniquely identified and referenced within the tray.

LED status indicators 38 are also provided on the tray with individual LED status indicators corresponding to individual pockets within the tray. The status indicators may be implemented using multi-color LEDs that will enable the operator to determine whether the portable computing device stored in the tray has been properly connected to the electrical connector, the charge status of the portable computing device, and optionally other status of the portable computing device. For example, the status indicators may glow amber when a portable computing device is connected to the electrical connector or to indicate that the portable computing device is charging and turn green when fully charged. The individual status indicators make it easy to determine if one or more of the portable computing devices stored within the tray has not been properly connected to the tray. Hence, the status indicators make it is easy to verify that all portable computing devices have been returned and are properly connected to the tray. Likewise, the status indicators make it easier to select portable computing devices that are fully charged when a portable computing device is to be removed from the tray.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A storage system for a plurality of portable computing devices, comprising:
   a base having a plurality of pockets formed therein, each pocket being sized to hold a portable computing device;
   electrical circuitry for charging and synchronizing the plurality of portable computing devices; and
   electrical circuitry for enabling multiple similarly constructed storage systems to be serially interconnected;
   wherein each pocket is designed to allow the portable computing device contained therein to lean slightly backward so that a viewing screen of the portable computing device is slanted toward a front of the tray while the portable computing device is stored within the tray.

2. The storage system of claim 1, wherein the electrical circuitry for charging and synchronizing the plurality of portable computing devices enables the portable computing devices to be synchronized with an external computer while stored within the storage system.

3. The storage system of claim 2, wherein the electrical circuitry for enabling multiple similarly constructed storage systems to be serially interconnected enables portable computing devices stored in the serially interconnected similarly constructed storage systems to be synchronized with the external computer.

4. The portable tray of claim 1, further comprising a first USB connector to connect the tray to a master computer to enable portable computing devices stored within the tray to be synchronized with the master computer while the portable computing devices are stored within the tray.

5. The portable tray of claim 4, further comprising a second USB connector to enable a second similarly configured tray to be connected to the tray, the second USB connector further enabling second portable computing devices stored within the second similarly configured tray to also be synchronized with the master computer.

6. The portable tray of claim 1, further comprising a plurality of status indicators, each status indicator corresponding to a respective one of the pockets in the tray, each status indicator enabling a charge state of a portable computing device contained within the respective pocket in the tray to be determined uniquely relative to charge states of other portable computing devices stored in other pockets in the tray.

7. The portable tray of claim 1, further comprising a lid which substantially overlaps the pockets when in a closed position to prevent removal of the portable computing devices stored in the pockets from the tray while the lid is in the closed position, the lid further being movable into an open position to allow removal of the portable computing devices from the tray while the lid is in the open position.

* * * * *